June 17, 1952 W. H. T. HOLDEN 2,600,502

CALLING LINE AND PRIVATE BRANCH EXCHANGE LINE IDENTIFIER

Filed April 24, 1948 6 Sheets-Sheet 1

INVENTOR
W. H. T. HOLDEN
BY [signature]
ATTORNEY

June 17, 1952 W. H. T. HOLDEN 2,600,502

CALLING LINE AND PRIVATE BRANCH EXCHANGE LINE IDENTIFIER

Filed April 24, 1948 6 Sheets-Sheet 2

INVENTOR
W. H. T. HOLDEN
BY
ATTORNEY

INVENTOR
W.H.T. HOLDEN
BY [signature]
ATTORNEY

June 17, 1952 W. H. T. HOLDEN 2,600,502

CALLING LINE AND PRIVATE BRANCH EXCHANGE LINE IDENTIFIER

Filed April 24, 1948 6 Sheets-Sheet 4

INVENTOR
W. H. T. HOLDEN
BY
ATTORNEY

June 17, 1952 W. H. T. HOLDEN 2,600,502

CALLING LINE AND PRIVATE BRANCH EXCHANGE LINE IDENTIFIER

Filed April 24, 1948 6 Sheets-Sheet 5

INVENTOR
W.H.T. HOLDEN
BY [signature]
ATTORNEY

INVENTOR
W.H.T. HOLDEN
BY [signature]
ATTORNEY

Patented June 17, 1952 2,600,502

UNITED STATES PATENT OFFICE 2,600,502

CALLING LINE AND PRIVATE BRANCH EXCHANGE LINE IDENTIFIER

William H. T. Holden, Woodside, N. Y., assignor to Bell Telephone Laboratories, Incorporated, New York, N. Y., a corporation of New York Application April 24, 1948, Serial No. 23,043

18 Claims. (Cl. 179—18)

This invention relates to systems for identifying the stations of telephone and similar lines.

In Patent No. 2,484,612 dated October 11, 1949, there is disclosed a system for identifying a telephone line by a single short impulse directed over a conductor associated with a calling line. The system disclosed in said application comprises common bus-bars interconnected by, and connected, subscribers' lines through gas-discharge diode tubes. The present invention is a modification of and an improvement on this system. I have discovered that distinct advantages may be obtained in reduced impedance at the bus-bars and practical elimination of surge effects thereover by using rectifiers instead of gas-discharge tubes, which is a feature of the present invention, and by other modifications. Furthermore, by arrangements herein disclosed, the present invention is adapted to the identification of the individual stations of party lines as well as stations of individual lines, and to the identification of private-branch-exchange stations.

Another feature of the invention is a means whereby the devices which register the identified designation are responsive to the rate of change of the magnitude of an impulse rather than merely to its magnitude alone. This makes possible the use of an extremely short impulse and results in a very rapid operation of the identifying system. Furthermore, the identifying equipment is not actuated by extraneous impulses lacking in the characteristic of a rapid rate of change of magnitude.

Still another feature of the invention is a means by which the identifying equipment is insensible to impulses of opposite polarity to those used for identification.

The above and other features of the invention will be more apparent from the accompanying description, the appended claims, and the drawings, which illustrate the invention as applied to the identification of the stations of individual, two-party, and private-branch-exchange lines, and in which:

Figures 1, 7:
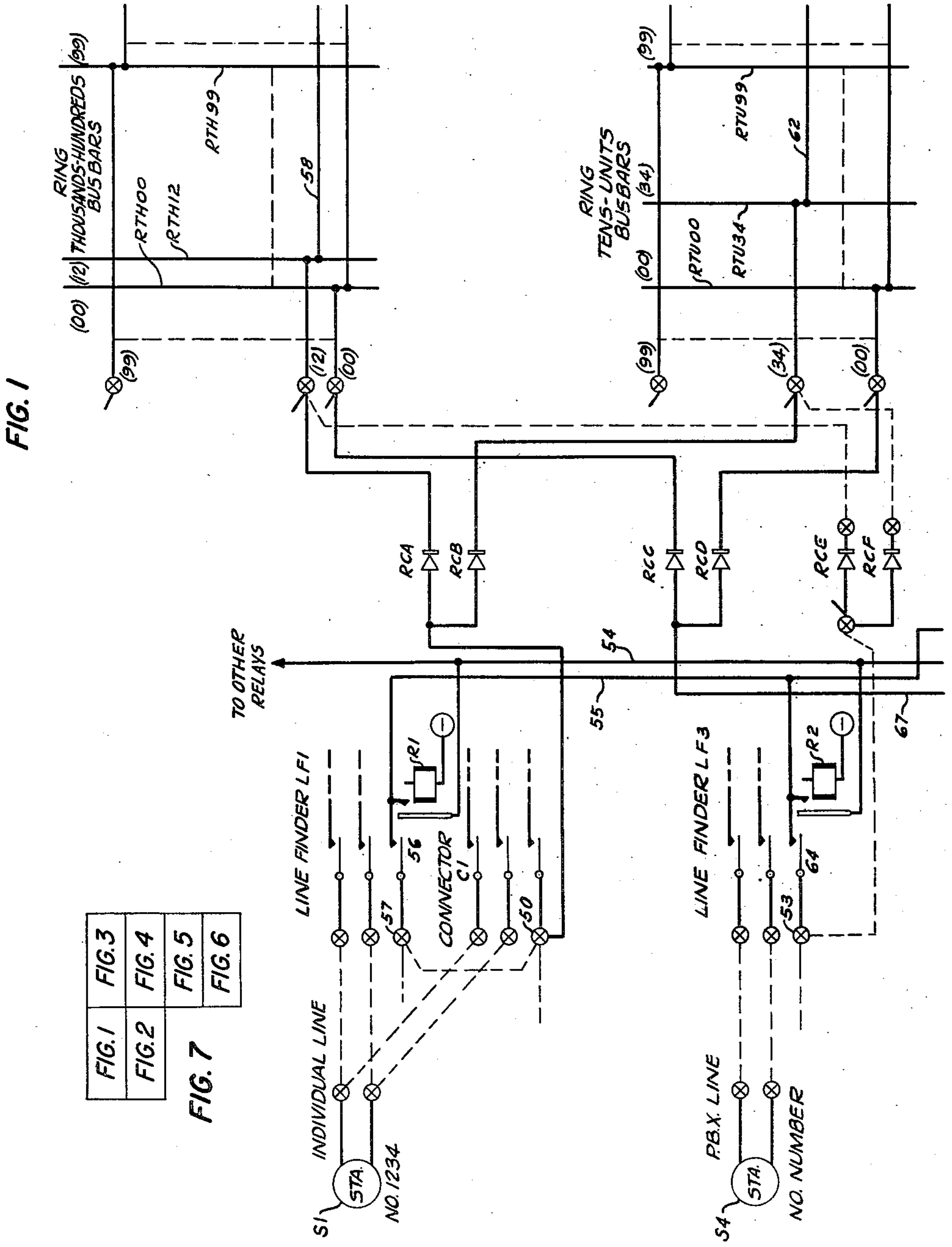
Fig. 1 shows an individual line, a private-branch-exchange line, and a portion of the equipment for identifying individual lines and "ring-party" stations of two-party lines.
Fig. 7 shows how the above figures should be placed in relation to one another to completely disclose the invention.
Figure 2:
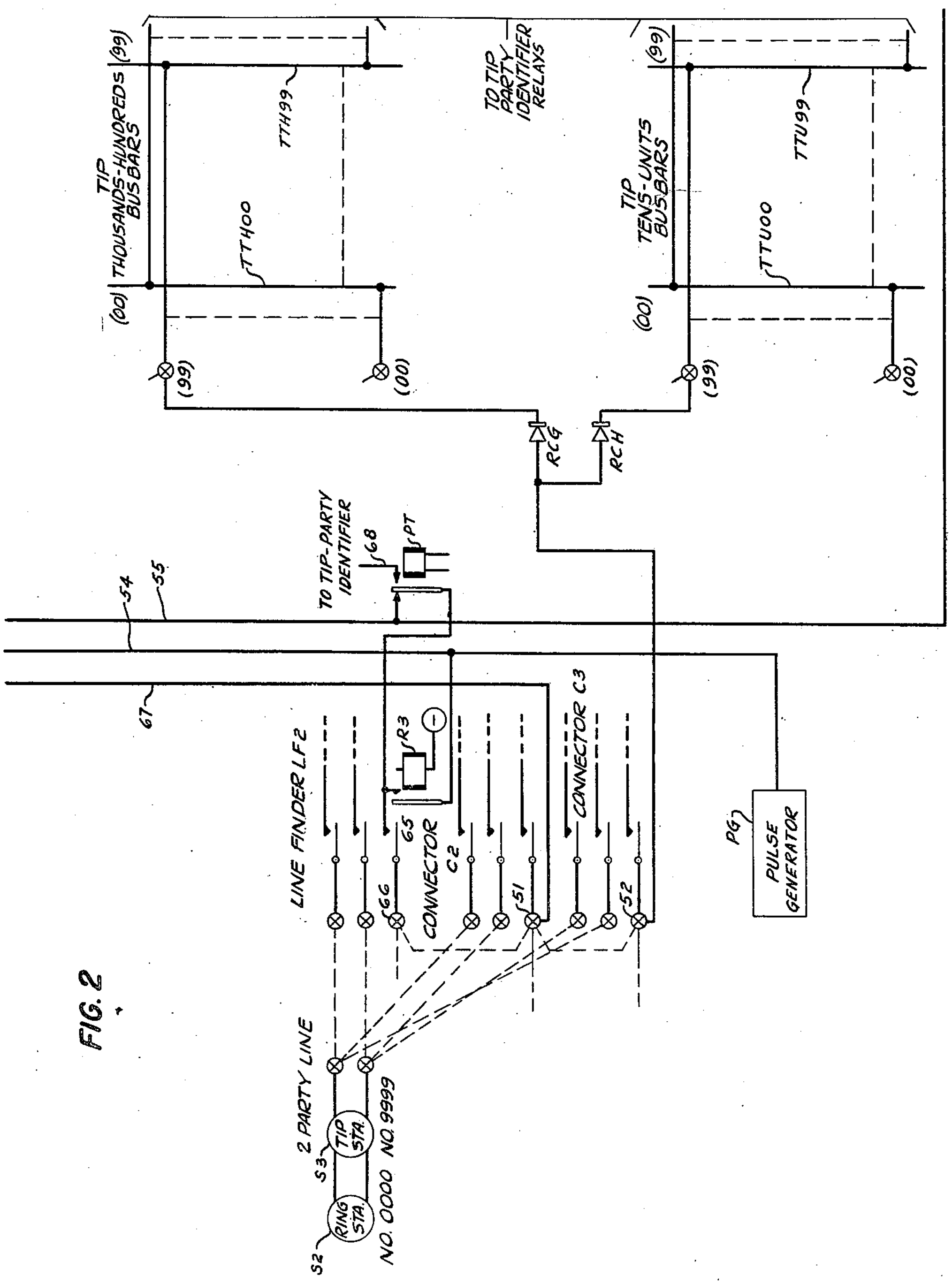
Fig. 2 shows a two-party line and a portion of the equipment for identifying "tip-party" stations of two-party lines. In this figure, the pulse generator for the identifying equipment is indicated.
Figure 3:
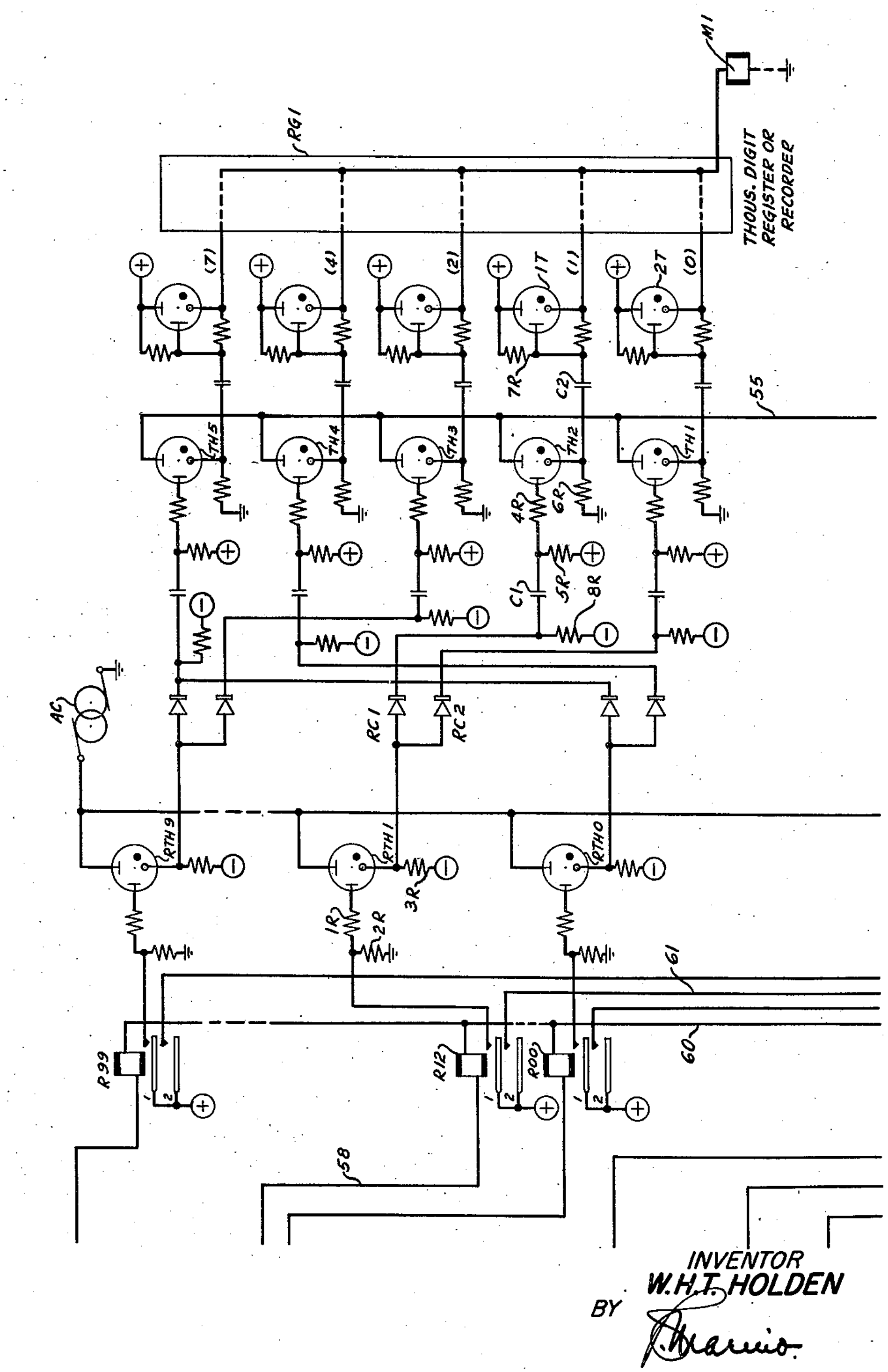
Figs. 3, 4, 5 and 6 show the remainder of the equipment for identifying individual lines and the "ring-party" stations of two-party lines.
Figure 4:
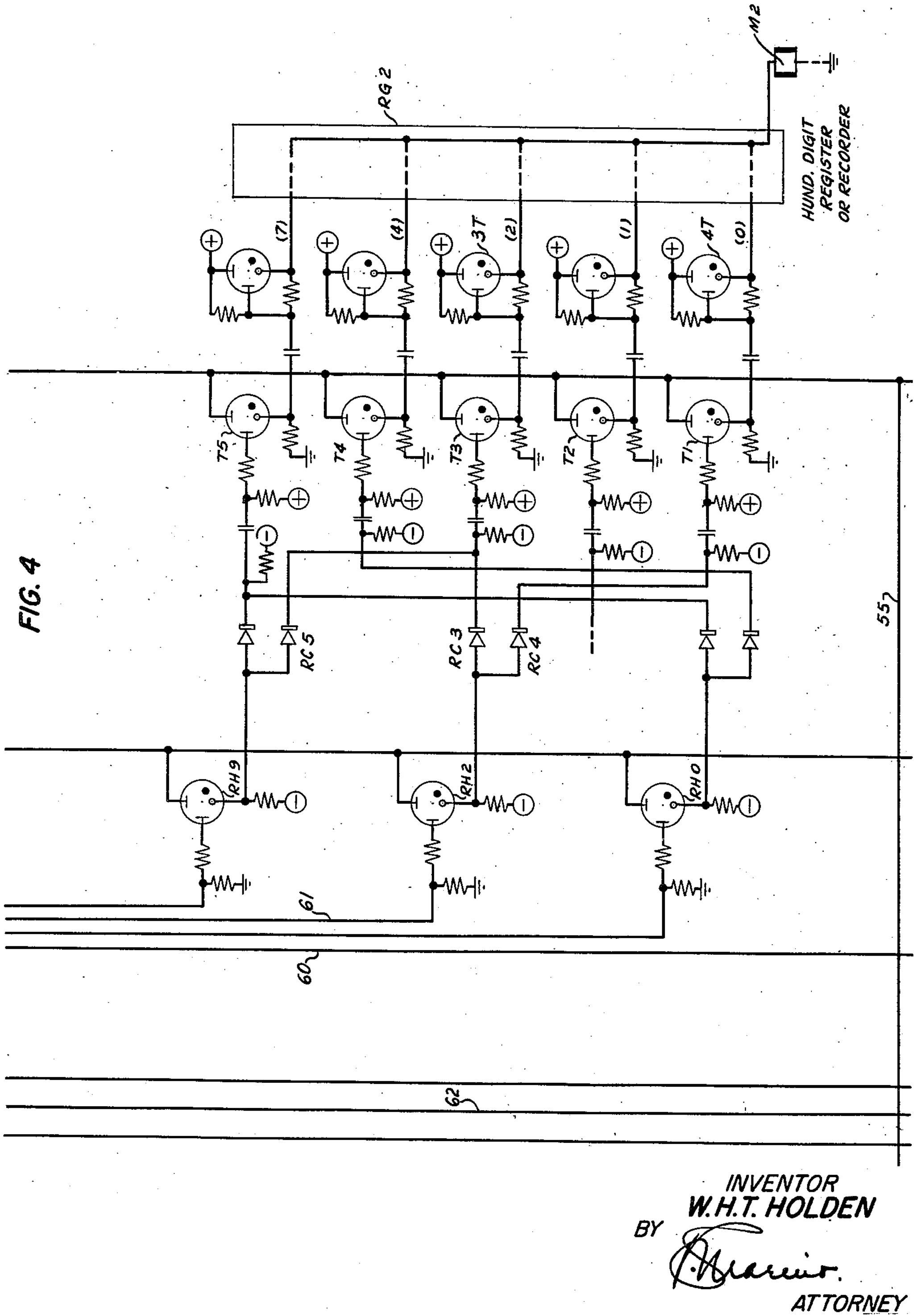
Figure 5:
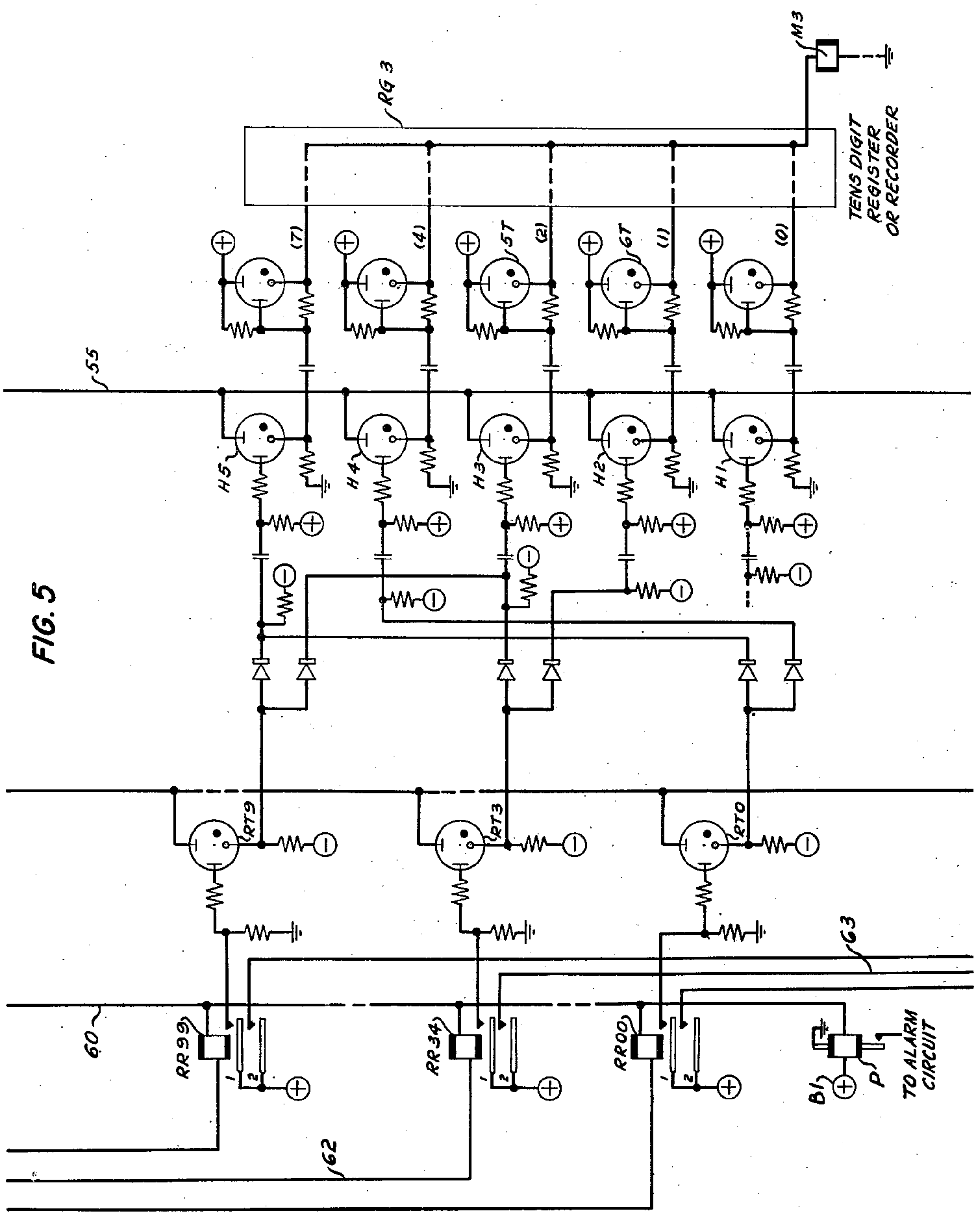
Figure 6:
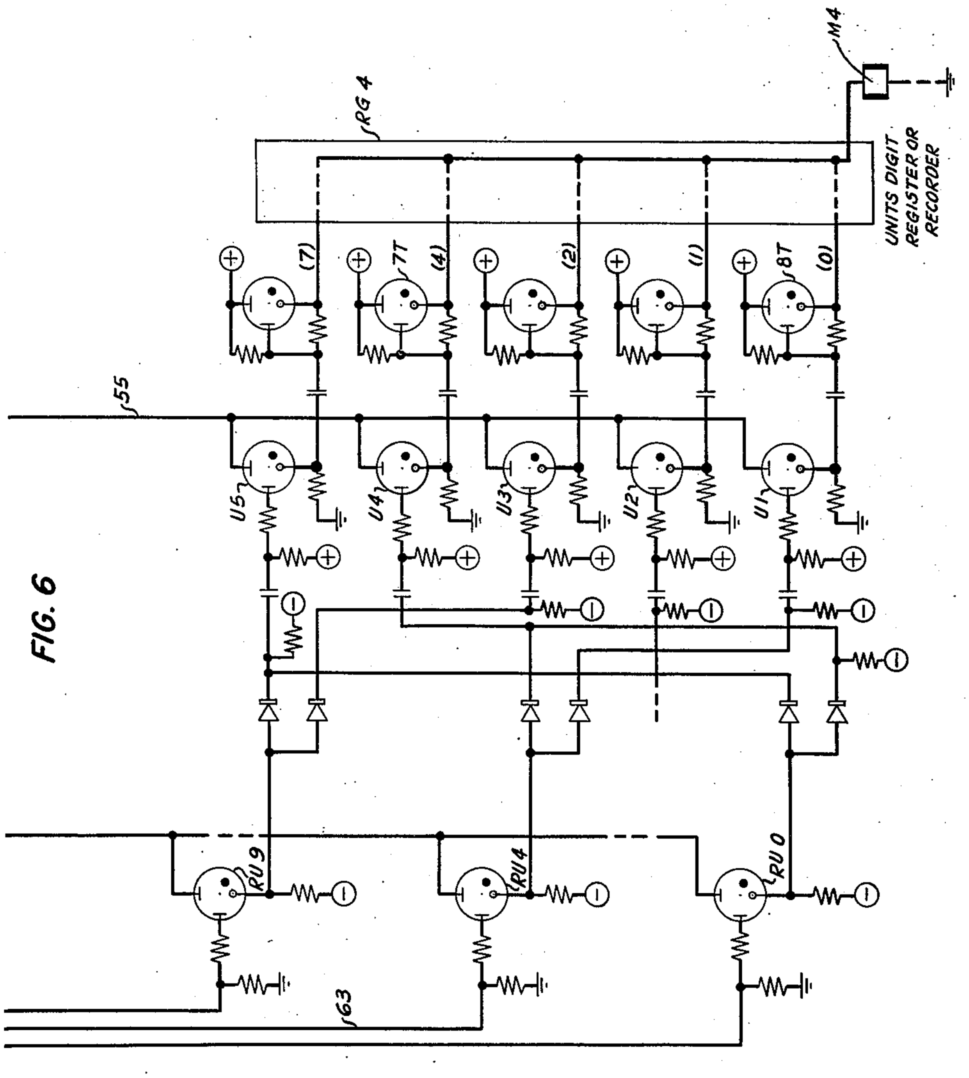

In many dial telephone systems, each set of connector terminals is assigned a particular directory number. The conductors of a subscriber's individual line are cross-connected to terminals of a line finder or other line-extending device for outgoing service and to terminals of a connector for incoming service, the connector terminals being those to which the directory number of the subscriber's line is assigned. Such a line, with one station S1, is shown in Fig. 1 cross-connected to line finder LF1 and to connector C1, the directory number being assumed to be "1234." Where there are two stations on a line, the conductors of the line are cross-connected to line-finder terminals for outgoing service and to two sets of connector terminals, one set of terminals being that to which the directory number of one of the stations is assigned and the other set of terminals being that to which the directory number of the other station is assigned. The sleeve terminals of the two sets of connector terminals are connected together. Such a line, with two stations S2 and S3, is shown in Fig. 2 cross-connected to line finder LF2 and to connectors C2 and C3, the directory number of station S2 (and the terminals of connector C2) being assumed to be "0000," and the directory number of station S3 (and the terminals of connector C3) being assumed to be "9999." In the case of private branch exchange lines, some of said lines are arranged for outgoing service only and do not have directory numbers assigned to them. These lines are connected to line-finder terminals but are not connected to connector terminals. A line of this kind, with a station S4, is shown in Fig. 1 cross-connected to line finder LF3.

In the present embodiment of my invention, I provide at least one identifier which I call the "ring-party" identifier. This identifier is capable of identifying and determining the directory numbers of calling stations of individual lines and the directory numbers of calling ring-party stations of two-party lines. It may also be employed, as hereinafter described, to identify the private branch exchange from which a call is made by a station in such exchange which is arranged for outgoing service only, and to determine the listed number of said private branch exchange, or the directory number of some other associated line. Where two-party lines are served, I provide a separate and similar identifier for identifying tip-party stations. Where no two-party lines are involved, this identifier may be omitted.

As in the system of my before-mentioned patent each identifier comprises one common bus-bar for each possible combination of thousands and hundreds digits of directory numbers and one common bus-bar for each possible combination of tens and units digits of directory numbers. In Fig. 1, bus-bars RTH00 . . . RTH99 are the bus-bars of a "ring-party" identifier for combinations of thousands and hundreds digits of director numbers and bus-bars RTU00 . . . RTU99 are the bus-bars of the same identifier for combinations of tens and units digits of directory numbers. In Fig. 2, bus-bars TTH00 . . . TTH99 are the bus-bars of a "tip-party" identifier for combinations of thousands and hundreds digits of directory numbers and bus-bars TTU00 . . . TTU99 are the bus-bars of the same identifier for combinations of tens and units digits of directory numbers. It will be observed that the bus-bars are alike for the two identifiers.

In the present embodiment of the invention, identified directory numbers are indicated to registering or recording devices by energizing two of a group of five conductors for each digit of directory number to be registered or recorded. The five conductors in each group are arbitrarily designated (0), (1), (2), (4), and (7), respectively, and combinations of these conductors are energized to indicate the different digits as follows:

| Digit | Conductors Energized |
|---|---|
| 1 | (0), (1) |
| 2 | (0), (2) |
| 3 | (1), (2) |
| 4 | (0), (4) |
| 5 | (1), (4) |
| 6 | (2), (4) |
| 7 | (0), (7) |
| 8 | (1), (7) |
| 9 | (2), (7) |
| 0 | (4), (7) |

In each of Figs. 3 to 6, a set of five conductors, designated as above, is shown, and a responsive recorder is indicated, which may be of any suitable type, such as, for example, the one shown in Patent No. 1,174,427 to C. L. and H. L. Krum, dated March 7, 1916, except that the recording magnets thereof are wired to the involved tubes (0)—(7) in said figures instead of to the contacts of a keyboard as shown in the patent. The recorders of Figs. 3 to 6 are for recording the thousands, hundreds, tens and units digits of directory numbers, respectively. They may, of course, be combined in one recorder. This arrangement for recording digits has the advantage of requiring less-complicated recording means than a system, such as the one shown in my above-mentioned copending application, in which one conductor is energized for each digit to be recorded. In carrying out the system of the present invention, I have provided one relay for each bus-bar, relay R12 R99 being provided for bus-bar RTH99, relay R12 for bus-bar RTH12, etc. The relays R99, R12, etc. control circuits comprising gas-discharge tubes shown in Figs. 3, 4, 5 and 6. The relays, tubes, and associated circuits shown are those for the ring-party identifier. Similar relays and circuits are provided for the tip-party identifier, but since these are duplicates of those shown for the ring-party identifier, it is not thought necessary to show them in the drawings.

The relays R99, R12, etc. respond to pulses transmitted from the bus-bars, and, in turn, apply pulses to the tubes TH1 . . . TH5, H1 . . . H5, T1 . . . T5, and U1 . . . U5, as described later. Other suitable means, such as electronic devices or rectifiers, could be used in place of said relays, either to produce and apply to said tubes pulses in accordance with those received from the bus-bars, or to transmit the pulses from the bus-bars directly to said tubes.

The identifiers are actuated by a pulse generator PG, indicated but not fully disclosed in Fig. 2, which continuously produces positive pulses. This generator may be of any suitable type and reference may be had to my above-mentioned patent for a disclosure of a suitable form of such a pulse generator.

In the present invention, the identifiers also comprise pairs of rectifiers, such as rectifiers RCA and RCB. These may be of any suitable well-known type, preferably the geranium type. One pole of one rectifier is connected to one of the bus-bars of one group and one pole of the other rectifier is connected to one of the bus-bars of the other group in one identifier. For example, one pole of rectifier RCA is connected to bus-bar RTH12 of the ring-party identifier which is assigned to the thousands and hundreds digit combination "12," while one pole of rectifier RCB is connected to bus-bar RTU34 of the ring-party identifier which is assigned to the tens and units digit combination "34." The pair of rectifiers RCA and RCB are, therefore, connected to the two groups of bus-bars of the ring-party identifier in accordance with the number "1234." Similarly, one pole of rectifier RCG is connected to bus-bar TTH99 of the tip-party identifier which is assigned to the thousands and hundreds digit combination "99," while one pole of rectifier RCH is connected to bus-bar TTU99 of the tip-party identifier which is assigned to the tens and units digit combination "99." The pair of rectifiers RCG and RCH are, therefore, connected to the tip-party identifier in accordance with the number "9999." Other pairs of rectifiers are similarly connected in accordance with other numbers so that there is one pair of rectifiers for each directory number to be recorded.

The rectifiers RCA, RCB, etc. are poled to oppose high resistance to positive potentials at the bus-bars to which they are connected. The windings of relays R99, R12, etc. are connected, through the winding of the polarized alarm relay P, to a battery B1 of low voltage. It will be observed that the positive potential of battery B1 is continuously applied through the winding of relay P and the windings of relays R99, R12, etc. to the bus-bars and so to the rectifiers, and continuously maintains the resistance characteristics of the rectifiers, if said rectifiers are of the metallic-oxide or similar type. The potential of battery B1 may have a value of 6–10 volts. The purpose of relay P is described later.

The sleeve terminal of each set of connector terminals which, as pointed out above, is associated with a particular directory number, is connected to the other poles of the pair of rectifiers which represents the same directory number. Thus, the terminals shown of connector C1 are assigned the directory number "1234" and the sleeve terminal 50 is connected to rectifiers RCA and RCB which are connected to the bus-bars in accordance with said number. Similarly, the sleeve terminal 51 of connector C2 is connected to rectifiers RCC and RCD for the directory number "0000," while the sleeve terminal 52 of connector C3 is connected to rectifiers RCG and RCH for the directory number "9999." When a subscriber's line is cross-connected to connector terminals for incoming service (which cross-connection is made in accordance with the directory number or numbers of the station or stations of said line) it is thereby automatically associated, through rectifiers, with the appropriate bus-bars of an identifier, or identifiers.

In the case of a private-branch-exchange line arranged for outgoing service only, such as the P. B. X line shown in Fig. 1, there are, however, no associated connector terminals. In this case the sleeve terminal 53 of the line finder LF3 is cross-connected to the appropriate poles of each of two additional rectifiers RCE and RCF, the other poles of which are cross-connected to bus-bars of an identifier in accordance with the directory number it is desired to record when a call is made from said line. It is assumed that station S4 is a station of the private branch exchange which also includes station S1, and whose listed directory number is "1234." In order that said number will be recorded, as described later, on a call from station S4, rectifiers RCE and RCF are cross-connected to bus-bars RTH12 and RTH34, respectively.

When a call is made from station S1, the line of said station is extended in the usual manner by line finder LF1. Then, when it is desired to identify station S1 and to record its directory number, a relay R1, which may be any suitable relay, preferably in the trunk to which the line of station S1 is extended, is operated in any suitable manner. A short pulse of positive high voltage from pulse generator PG is thereby transmitted over conductor 54, contacts of relay R1, and conductor 55 to the anodes of all the gas-discharge triode tubes TH1 . . . TH5, H1 . . . H5, T1 . . . T5 and U1 . . . U5 of the ring-party identifier. The starting element of each of these tubes is maintained at positive potential, as shown in the drawing. For example, the starting element of tube TH2 is maintained at positive potential by positive battery through resistors 5R and 4R. However, this potential is insufficient to cause said tube to conduct even when its anode is also supplied with positive potential by the pulse described above. Any of said tubes will conduct when its anode is supplied with positive potential by the pulse described above only if, at the same time, its starting element is made more than normally positive. Said pulse from pulse generator PG is also transmitted through sleeve contacts 56 of line finder LF1 and the cross-connection between terminals 57 and 50 to rectifiers RCA and RCB. Said rectifiers are poled to offer a low resistance to this pulse which, therefore, passes with little diminution through said rectifiers. The pulse through rectifier RCA is transmitted to bus-bar RTH12, thence over conductor 58 through the winding of relay R12, conductor 60, and the winding of polarized relay P to the low-voltage source B1. Since it is desirable, in order to minimize the holding time of the identifying equipment, that the pulse from pulse generator PG be short, the peak voltage of the pulse should be sufficiently high to cause operation of relay R12. Relay P, however, is polarized to respond only to current flow in the opposite direction and does not operate. Of course, if a negative pulse is applied by pulse generator PG or by any other means, it will be so attenuated by the rectifiers that relays R12 and P will be unaffected thereby. When relay R12 operates, its No. 1 contacts apply positive battery to the junction of resistors 1R and 2R thereby making the starting element of the tube RTH1 (which does not normally conduct) sufficiently positive so that, on a positive wave of alternating current from the source AC, said tube conducts over a circuit extending from said source through the anode-cathode space of said tube and resistor 3R to negative battery. The cathode of said tube, which is normally negative, is thereby suddenly made positive, producing a positive pulse through rectifiers RC1 and RC2 which are poled to offer a low resistance to said pulse. The positive pulse through rectifier RC1 produces a corresponding positive pulse from capacitor C1 to the junction of resistors 4R and 5R. This raises the potential of the starting element of tube TH2 and, at the same time, the anode of said tube is supplied with positive potential by the pulse transmitted from pulse generator PG, as described above. Said tube, therefore, momentarily conducts and its cathode is thereby suddenly made positive by the voltage drop in resistor 6R, producing from capacitor C2 a positive pulse to the starting element of tube 1T. This starting element is normally maintained positive by positive battery through resistor 7R but insufficiently so for said tube to conduct. The positive pulse from capacitor C2, however, raising the potential of the starting element, causes this tube to conduct over a circuit extending from positive battery through the anode-cathode space of said tube, a responsive element in the recorder RG1, and the winding of magnet M1 to ground in said recorder. The responsive element in the recorder is thereby actuated to record the energization of the conductor having the designation (1).

In a similar manner, the pulse through rectifier RC2 actuates tubes TH1 and 2T to energize the conductor having the designation (0) and to actuate a responsive element in recorder RG1 connected thereto. The combination (0) (1) is thereby recorded which, in accordance with the code previously given, corresponds to the digit "1," which is thereby recorded. This is the thousands digit of the directory number "1234" of the calling station S1. Tubes 1T and 2T continue to conduct and magnet M1 is thereby energized until the circuit ground in recorder RG1 is removed by any suitable means. Said tubes thereupon cease to conduct and magnet M1 is deenergized. The deenergization of magnet M1 actuates the usual mechanism for advancing the recording medium to receive the next recording operation.

The No. 2 contacts of relay R12 apply positive potential over conductor 61, actuating tube RH2 in the same manner as described above for tube RTH1. Tubes T3 and 3T are thereby actuated by a pulse through rectifier RC3 and tubes T1 and 4T are actuated by a pulse through rectifier RC4, in the manner described above for tubes TH2, 1T, TH1, and 2T. Two conductors having the designations (0) and (2) and corresponding responsive elements in recorder RG2 are thereby energized to register or record the combination which corresponds to the digit "2," which is the hundreds digit of the directory number "1234" of station S1. Magnet M2 is also operated in the same manner as magnet M1.

The pulse through rectifier RCB to bus-bar RTU34 and over conductor 62 operates relay RR34 in the manner described above for relay R12. Positive potential is thereby applied to tube RT3 and, over conductor 63, to tube RU4, actuating said tubes and in turn, tubes H3, 5T; H2, 6T, U4, 7T, U1 and 8T are actuated. Combinations of conductors and responsive elements in the recorders RG3 and RG4 are thereby energized to record the digits "3" and "4," which are the tens and units digits, respectively, of the directory number "1234" of station S1. It is not thought necessary to describe these latter operations in detail as they are exactly similar to the operations already described and are readily followed from the descriptions already given. It may be noted, however, that the rectifiers RC1, RC2, etc. prevent the actuation of tubes other than those named above. The positive pulse through rectifier RC3, for example, which actuates tube T3, is unable to pass through the high resistance of rectifier RC5 to cause actuation of tube T5. It will be observed also that these rectifiers are normally supplied with potential, for example, negative potential through resistor 3R, to rectifiers RC1 and RC2, which maintains their resistance characteristics.

In identifying station S1 and recording its directory number, as described above, relay R1 need be operated only long enough to transmit one pulse from the pulse generator PG. However, it can do no harm to operate said relay for a period long enough to transmit more than one pulse. The additional pulses, while not normally required, may serve to ensure the operation of relays R12 and RR34 should they fail to operate on the first pulse. Said relays remain operated only for short periods since they are operated by short pulses, but they need remain operated only long enough to actuate tubes RTH1, TH2, etc.

It will also be observed that tube TH2 (for example) is not actuated directly by the pulse from tube RTH1 and tube 1T is not actuated directly by the pulse from tube TH2. The capacitor C1 prevents any steady potential from tube RTH1 from reaching the starting element of tube TH2 and the capacitor C2 prevents any steady potential from tube TH2 from reaching the starting element of tube 1T. Tube TH2, for example, is actuated by the rise of potential at its starting element and said potential rises sufficiently to fire said tube only if the potential at the cathode of tube RTH1 rises rapidly compared to the time-constant of the circuit of capacitor C1. By suitable choice of the elements of this circuit, said time-constant may be made sufficiently small so that tube TH2 is not actuated by a comparatively slow rise of potential through rectifier RC1, for example, a rise of sine-wave characteristic. Yet it is a characteristic of gas-discharge tubes, such as tube RTH1, that, when fired, the potential of the cathode rises rapidly and this rise is sufficiently rapid to induce a corresponding rise at the starting element of tube TH2 which is sufficient to fire the latter tube. But tube TH2 is actuated in response to the operation of relay R12. Said relay, therefore, need only be operated long enough to fire tube RTH1, which time is, at the maximum, one cycle of the alternating-current from the source AC. Relay R12 is, however, operated by the pulse supplied by pulse generator PG over conductor 58 applied to the calling line to identify said line. In the present invention, therefore, as in the disclosure of my copending application mentioned above, the pulse applied to a line to identify it may be very short. As has been pointed out above, however, the tubes 1T, 2T, etc. which control the recording devices remain actuated until released to ensure the satisfactory operation of said devices.

It will be apparent now, without further detailed description, that, when a call is made by station S4, the line of said station extended by line finder LF3, and relay R2 operated to identify said station, a pulse is transmitted from pulse generator PG through contacts of said relay, sleeve contacts 64 of line finder LF3, rectifiers RCE and RCF, and the cross-connections from said rectifiers to bus-bars RTH12 and RTU34, thereby actuating the equipment, in the manner described above, to record the directory number "1234."

When a call is made by station S2, the line of said station is extended by line finder LF2, and relay R3 operated to identify said station, a pulse from pulse generator PG is transmitted through contacts of said relay, sleeve contacts 65 of line finder LF2, the cross-connection between terminals 66 and 51, and conductor 67 through rectifiers RCC and RCD to bus-bars RTH00 and RTU00 of the ring-party identifier. This pulse is also transmitted through the cross-connection between terminals 51 and 52 and through rectifiers RCG and RCH to bus-bars TTH99 and TTU99 of the tip-party identifier. The pulse is transmitted also through contacts of relay R3, back contacts of relay PT and conductor 55 to the anodes of tubes of the ring-party identifier. Relay PT is the well-known party-test relay, such as is shown, for example, and designated 122 in the patent to W. H. Scheer, No. 2,332,015, issued October 19, 1943. When a tip-party station calls, the line is grounded at said station and relay PT operates to said ground while, on a call from a ring-party station, there is no ground on the line and relay PT does not operate. Since station S2 is a ring-party station, relay PT is not operated in the present case. The pulse on bus-bars RTH00 and RTU00 of the ring-party identifier, in conjunction with the pulse on conductor 55, actuates the ring-party identifier, in the manner already described, to record the number "0000," which is the directory number of station S2. No pulse to the tip-party identifier corresponding to the pulse on conductor 55 is furnished and the pulse on bus-bars TTH99 and TTU99 of the tip-party identifier is, therefore, ineffective.

When, however, a call is made by station S3, the line is extended by line finder LF2, and relay R3 is operated to identify said station, a pulse from pulse generator PG is transmitted through contacts of relay R3 and sleeve contacts 65 of line finder LF2 to the four bus-bars named above. Station S3 being a tip-party station, relay PT is now operated. Means are familiar in the art whereby stations on two-party lines may be automatically identified in respect to whether the tip station (as tip station S3, for example) or the ring station (as ring station S2, for example) is calling. Patent No. 1,823,688, issued to H. Hovland on September 15, 1931, illustrates an arrangement for "identifying" a particular calling station on a two-party line; relay 31 therein, corresponding to relay PT in the present disclosure, operating when the tip station is calling and remaining normal when the ring station is calling. The pulse from pulse generator PG is, therefore, also transmitted through contacts of relay R3, front contacts of relay PT, and conductor 68 to the tip-party identifier (conductor 68 in the tip-party identifier corresponding to conductor 55 of the ring party identifier). No pulse is transmitted to conductor 55. The pulse on bus-bars TTH99 and TTU99, in conjunction with the pulse on conductor 68, is, therefore, effective to actuate the tip-party identifier, in the manner already described, to record the number "9999," which is the directory number of station S3, while the pulse on bus-bars RTH00 and RTU00 of the ring-party identifier is ineffective.

Because of the high reverse resistance of rectifiers, accumulated high potentials drain but slowly through them. Such potentials on the bus-bars may drain through the windings of the relay R00 . . . R99 and the winding of relay P to battery BB1. Resistors, such as resistor 8R, are provided to permit abnormal charges on the capacitors, such as capacitor C1, to be dissipated. The battery connected to these resistors should have the same potential as the battery connected to the cathode resistors, such as resistor 3R, on the opposite side of the rectifiers.

A grounded bus-bar will, however, render ineffective all pulses transmitted to it. In the present embodiment of my invention, if any bus-bar, for example, bus-bar RTU34, becomes grounded, polarized relay P operates over a circuit extending from battery B1 through the winding of said relay, the winding of relay RR34, and conductor 62 to the ground on bus-bar RTU34. The contacts of relay P actuate any suitable form of alarm circuit.

I have illustrated my invention in connection with a telephone system in which directory numbers of four digits are recorded as identifications of calling stations. My invention is, however, not limited to systems of this character. It may be applied, in conjunction with the teachings of my above-mentioned copending application or independently thereof, to other systems and for registering, recording, or indicating directory numbers of more or less than four digits or identifications other than directory numbers. If registering only of the identification is required, registering means may be substituted for the recorders RG1 . . . RG4. Other applications, without departing from the spirit of the invention, will be apparent to those skilled in the art.

What is claimed is:

1. In combination, a line having an identifying designation, a terminal individual to said line, rectifying devices connected to said terminal, automatic means for applying an impulse to said rectifier devices over said terminal, means for producing other impulses, means responsive to said impulse through said rectifying devices for rendering effective said last-mentioned means, and means jointly responsive to an impulse from said automatic means and to said other impulses for identifying said designation.

2. In combination, a line having an identifying designation, a terminal individual to said line, rectifying devices connected to said terminal, automatic means for applying an impulse to said rectifying devices over said terminal, means for producing other impulses of variable magnitude, means responsive to said impulse through said rectifying devices, means responsive to the operation of said last-mentioned means for rendering said variable magnitude impulse producing means effective, and means jointly responsive to said impulse and to the change in magnitude of an impulse from said variable impulse producing means for identifying said designation.

3. In combination, a line having an identifying designation, a terminal for said line, means for applying an impulse to said terminal, first rectifying devices, means responsive to said impulse through said first rectifying devices, means responsive to said last-mentioned means for producing other impulses, second rectifying devices, and means responsive to said other impulses through said second rectifying devices for identifying said designation.

4. In an identifying system, a line having an identifying designation, a terminal for said line, means for applying an impulse to said terminal, first rectifying devices, means responsive to said impulse through said first rectifying devices for producing other impulses, second rectifying devices through which said other impulses are transmitted, and means responsive to the change in magnitude of said transmitted impulses for identifying said designation.

5. In an identifying system, a line having an identifying designation composed of digits, a terminal individual to said line, rectifying devices connected to said line terminal, conductive paths indicative of each of said digits, automatic means for applying an impulse to said rectifying devices over said terminal, means for directing said impulse to each of said conductive paths, means for producing other impulses, means connected to each of said conductive paths responsive to said impulse through said rectifying devices, and means jointly responsive to said impulse and to an impulse from said means for producing other impulses, effective over said last-mentioned means for recording said digits.

6. In a system for identifying calling stations, a line having a plurality of stations thereon, each of said stations having an individual terminal and an identifying designation, means responsive to a calling one of said stations for applying an impulse to the terminal of said calling station, rectifying devices, means responsive to said impulse through said rectifying devices, and means responsive to said last-mentioned means for identifying the designation of said calling station.

7. In a system for identifying calling stations, a line having a plurality of stations thereon, each of said stations having an individual terminal and an identifying designation, means responsive to any calling one of said stations for applying an impulse to the terminal of said calling station, rectifying devices, means responsive to said impulse through said rectifying devices for transmitting said impulse, and means responsive to the change in magnitude of said transmitted impulse for identifying the designation of said calling station.

8. In a system for identifying calling stations, a line having a plurality of stations thereon, each of said stations having an individual terminal and an identifying designation, means responsive to any calling one of said stations for applying an impulse to the terminal of said calling station, means comprising rectifying devices responsive to said impulse for producing other impulses, and means responsive to said other impulses for identifying the designation of said calling station.

9. In a system for identifying calling stations, a line having a plurality of stations thereon, each of said stations having an individual terminal and an identifying designation, means responsive to any calling one of said stations for applying an impulse to the terminal of said calling station, means comprising rectifying devices responsive to said impulse for producing other impulses, and means responsive to the change in magnitude of said other impulses for identifying the designation of said calling station.

10. In a system for identifying calling stations, a line having a plurality of stations thereon, each of said stations having an individual terminal and an identifying designation composed of digits, conductive paths each indicative of a plurality of digits, means responsive to any calling one of said stations for applying an impulse to the terminal of said calling station, means comprising rectifying devices responsive to said impulse to direct said impulse to conductive paths indicative of the digits of the designation of said calling station, and means on each of said latter conductive paths responsive to said impulse for recording the digits of the designation of said calling station.

11. In a system for identifying calling stations, a line having a plurality of stations thereon, each of said stations having an individual terminal and an identifying designation composed of digits, conductive paths each indicative of a plurality of digits, means responsive to any calling one of said stations for applying an impulse to the terminal of said calling station, means comprising rectifying devices responsive to said impulse to direct said impulse to those of said conductive paths which are indicative of the digits of designation of said calling station, means on each of said latter conductive paths responsive to said impulse to produce other impulses, and means responsive to a change in magnitude of said other impulses for recording the digits of the designation of said calling station.

12. In a signaling system, a first line having an identifying designation, a second line, a terminal for said second line, rectifying devices, a first source of impulses and a second source of impulses, means for applying an impulse from said first source to said rectifying devices over said terminal when said second line is actuated, and means jointly responsive to the impulse applied to said rectifying devices and to an impulse from said second source for identifying the designation of said first line.

13. In an identifying system, a line having an identifying designation composed of digits, a terminal individual to said line, a first plurality of conductive paths indicative of digits, means for applying a first impulse to said terminal, means comprising rectifying devices for directing said first impulse from said terminal over those of said conductive paths which are indicative of the digits designating said station, means responsive to said first impulse for producing other impulses, means including a second plurality of conductive paths indicative of digits, said other impulses being selectively transmitted over said second plurality of conductive paths in accordance with the digits designating said line, means for applying a second impulse to all the paths in said second plurality of conductive paths, and means in those conductive paths of said second plurality of conductive paths over which said other impulses were transmitted responsive jointly to said other impulses and to said second impulse for recording each of the digits composing the designation of said line.

14. In an identifying system, a line having a plurality of stations thereon, each of said stations having a terminal individual thereto and an identifying designation, means for applying impulses to said terminals, two identifiers each responsive to said impulses over said terminals, means responsive to one of said stations when actuated for actuating one of said identifiers for response to said impulses, thereby to identify the designation of said station, and means responsive to another of said stations when actuated for actuating another of said identifiers, thereby to identify the designation of said other station.

15. In an identifying system, a line having a plurality of stations thereon, each of said stations having a terminal individual thereto and an identifying designation, means for applying impulses to said termianls, two station identifiers, means responsive to one of said stations when actuated for directing said impulses over both of said terminals to each of said identifiers, means responsive to said actuated station for applying other impulses to one of said identifiers, means jointly responsive to said directed impulses and said other impulses for actuating said one identifier to identify the designation of said actuated station, means responsive to the actuation of said other station for directing said other impulses to said other identifier, and means jointly responsive to said directed impulses and said other impulses for actuating said other identifier to identify the designation of said other actuated station.

16. In an identifying system, a line having an identifying designation composed of digits, a terminal for said line, a first plurality of conductive paths, means for applying a first impulse to certain of said paths over said terminal, means in said certain conductive paths responsive to said first impulse, a second plurality of conductive paths for each of said digits, means for applying a second impulse through said responsive means to those conductive paths in said second plurality of conductive paths which are representative of the digits of said line, means for applying a third impulse to each path in said second plurality of conductive paths, and means responsive jointly to said second impulse and to said third impulse on the paths to which said second impulse was applied for identifying the digits of said station.

17. In an identifying system, a line having an identifying designation composed of digits, a terminal individual to said line, conductive paths indicative of digits, rectifying devices connected to said terminal and to those of said conductive paths which represent the digits of said line, a first source of impulses, means for applying an impulse from said source to said latter paths over said terminal and said rectifying devices, means connected to said latter paths responsive to said impulse, a second source of impulses, and means jointly responsive to the operation of said responsive means, to an impulse from said second source of impulses, and to an impulse from said first source of impulses for recording the digits designating said line.

18. In an identifying system, a line having an identifying designation composed of digits, a terminal individual to said line, conductive paths representative of digits, rectifying devices connected to said terminal and to those of said conductive paths which are representative of the digits of said line, a first source of impulses and a second source of impulses, means for applying an impulse from said first source over said terminal and through said rectifying devices to each of said latter conductive paths, means operative in response to said impulse over each of said paths, and means jointly responsive to the operation of said last-mentioned means and to an impulse from said second source for identifying all of said digits.

WILLIAM H. T. HOLDEN.

REFERENCES CITED

The following references are of record in the file of this patent:

UNITED STATES PATENTS

| Number | Name | Date |
| --- | --- | --- |
| 1,663,747 | Bascom | Mar. 27, 1928 |
| 2,244,700 | Horton | June 10, 1941 |
| 2,292,977 | Taylor | Aug. 11, 1942 |
| 2,299,513 | Taylor | Oct. 20, 1942 |
| 2,314,961 | Williams | Mar. 30, 1943 |
| 2,338,242 | Haigh | Jan. 4, 1944 |
| 2,484,612 | Dehn et al. | Oct. 11, 1949 |